United States Patent
Freer et al.

(10) Patent No.: US 11,084,998 B2
(45) Date of Patent: Aug. 10, 2021

(54) DIESEL BOILING-RANGE FUEL BLEND AND METHODS OF MAKING THE SAME

(71) Applicant: ExxonMobil Research and Engineering Company, Annandale, NJ (US)

(72) Inventors: Alexander S. Freer, Philadelphia, PA (US); Charles D. Lund, Calgary (CA); Heather D. Hamje, Brussels (BE); Krystal B. Wrigley, Turnersville, NJ (US); Kenneth C. H. Kar, Philadelphia, PA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 36 days.

(21) Appl. No.: 15/877,824

(22) Filed: Jan. 23, 2018

(65) Prior Publication Data

US 2018/0237710 A1    Aug. 23, 2018

Related U.S. Application Data

(60) Provisional application No. 62/461,457, filed on Feb. 21, 2017.

(51) Int. Cl.
*C10L 1/08* (2006.01)
*C10L 1/02* (2006.01)

(52) U.S. Cl.
CPC .............. *C10L 1/08* (2013.01); *C10L 1/023* (2013.01); *C10L 1/026* (2013.01); *C10L 2200/0446* (2013.01); *C10L 2200/0469* (2013.01); *C10L 2200/0476* (2013.01); *C10L 2230/08* (2013.01); *C10L 2270/026* (2013.01); *C10L 2290/24* (2013.01); *Y02E 50/10* (2013.01)

(58) Field of Classification Search
CPC .................... C10L 1/08; C10L 2200/0446
See application file for complete search history.

(56) References Cited

U.S. PATENT DOCUMENTS

| | | | | |
|---|---|---|---|---|
| 9,828,564 | B2 * | 11/2017 | West | C10M 129/78 |
| 2003/0085153 | A1 * | 5/2003 | O'Rear | C10G 2/32 |
| | | | | 208/63 |
| 2004/0128905 | A1 * | 7/2004 | Clark | C10L 1/18 |
| | | | | 44/398 |

(Continued)

FOREIGN PATENT DOCUMENTS

| | | | |
|---|---|---|---|
| WO | 20110073780 A1 | 6/2011 | |
| WO | WO-2011073780 A1 * | 6/2011 | C10L 1/14 |

OTHER PUBLICATIONS

The International Search Report and Written Opinion of PCT/US2018/014827 dated Apr. 5, 2018.

*Primary Examiner* — Ellen M McAvoy
*Assistant Examiner* — Ming Cheung Po
(74) *Attorney, Agent, or Firm* — Robert A. Migliorini

(57) ABSTRACT

Diesel boiling-range fuel blends including renewable diesel, biodiesel, and petrodiesel, where the diesel boiling-range fuel blend is capable of producing a minimal volume change of at least one swellable elastomer in a diesel boiling-range fuel system are provided herein. Methods of making the diesel boiling-range fuel blend as well as methods of reducing swellable elastomer shrinkage are also provided herein.

20 Claims, 2 Drawing Sheets

(56) References Cited

U.S. PATENT DOCUMENTS

2013/0333652 A1\* 12/2013 Trewella .................. C10L 1/06
   123/1 A
2015/0368576 A1\* 12/2015 Boonwatsakul .......... C10L 1/12
   123/1 A \* cited by examiner ously found that blending a combination of renewable diesel and biodiesel with a petrodiesel fuel can produce a diesel boiling-range fuel blend having substantially reduced aromatics content as well as the ability to minimize elastomer shrinkage in fuel systems.

DIESEL BOILING-RANGE FUEL BLEND AND METHODS OF MAKING THE SAME

CROSS-REFERENCE TO RELATED APPLICATIONS

This application claims the benefit of U.S. Provisional Application No. 62/461,457, filed on Feb. 21, 2017, the entire contents of which are incorporated herein by reference.

FIELD

This invention relates to diesel boiling-range fuel blends, which are capable of reducing swellable elastomer shrinkage in fuel systems, and methods of making such fuel blends.

BACKGROUND

Concerns with material compatibility within fuel systems may arise when fuels with different compositions are introduced in the fuel system. For example, some elastomers (e.g., nitrile rubbers) in vehicle fuel systems are known to swell when exposed to high aromatic fuels, such as conventional high aromatic diesel fuels. So long as the aromaticity of the fuel remains substantially constant, swelling of the elastomer may be a non-issue. However, increasing amounts of renewable components, such as renewable diesel and/or biodiesel, are blended into diesel fuel to meet environmental regulations requiring lower sulfur and/or lower aromatic content in diesel fuel. While a high aromatic fuel may cause swelling of elastomers, conversely, a lower aromatic fuel can cause shrinking of the elastomers. Thus, blending in low aromatic renewable diesel can lead to a significant reduction in aromatics, but such a change in fuel composition may cause shrinkage of elastomers that have previously been swollen by high aromatic fuels. This swelling followed by shrinking of the elastomers can lead to softening and degradation of the elastomer ultimately resulting in fuel leaks and vehicle failures.

In some instances, failure of elastomers may occur when renewable diesel is blended in an amount to cause a greater than 10% reduction in aromatics in the diesel fuel. Accordingly, blending of renewable diesel into a high aromatic diesel may be limited so that a greater than 10% reduction in aromatics does not occur. Thus, there remains a need for diesel fuel blends that can allow for the inclusion of renewable components to lower aromatics content while mitigating elastomer shrinkage.

SUMMARY

It has been unexpectedly found that blending a combination of renewable diesel and biodiesel with a petrodiesel fuel can produce a diesel boiling-range fuel blend having substantially reduced aromatics content as well as the ability to minimize elastomer shrinkage in fuel systems.

Thus, in one aspect, this disclosure relates to a diesel boiling-range fuel blend comprising: a renewable diesel in an amount of at least about 20 vol %; a biodiesel in an amount of about 0.50 vol % to about 10 vol %; and a petrodiesel fuel in an amount of at least about 40 vol %; wherein the diesel boiling-range fuel blend is capable of producing a volume change of at least one swellable elastomer in a diesel-boiling range fuel system within about 1.0% compared to a reference volume change of the least one swellable elastomer; wherein the volume change is a percentage change in volume of the least one swellable elastomer when contacted with: (i) the petrodiesel fuel or a different petrodiesel fuel, and then (ii) the diesel boiling-range fuel blend.

In still another aspect, this disclosure relates to a method for reducing swellable elastomer shrinkage in a diesel-boiling range fuel system. The method comprises: contacting at least one swellable elastomer with a diesel boiling-range fuel blend comprising: a renewable diesel in an amount of at least about 20 vol %; a biodiesel in an amount of about 0.50 vol % to about 10 vol %; and a petrodiesel fuel in an amount of at least about 40 vol %; wherein the at least one swellable elastomer undergoes a volume change within about 1.0% compared to a reference volume change; wherein the volume change is a percentage change in volume of the least one swellable elastomer when contacted with: (i) the petrodiesel fuel or a different petrodiesel fuel, and then (ii) the diesel boiling-range fuel blend.

In still another aspect, this disclosure relates to a method for preparing a diesel boiling-range fuel blend comprising: blending at least about 20 vol % renewable diesel and about 0.50 vol % to about 10 vol % biodiesel with at least about 40 vol % of a petrodiesel fuel to produce a diesel boiling-range fuel blend having an aromatics content of less than or equal to about 25 vol %.

Other embodiments, including particular aspects of the embodiments summarized above, will be evident from the detailed description that follows.

DETAILED DESCRIPTION

Figure 1:
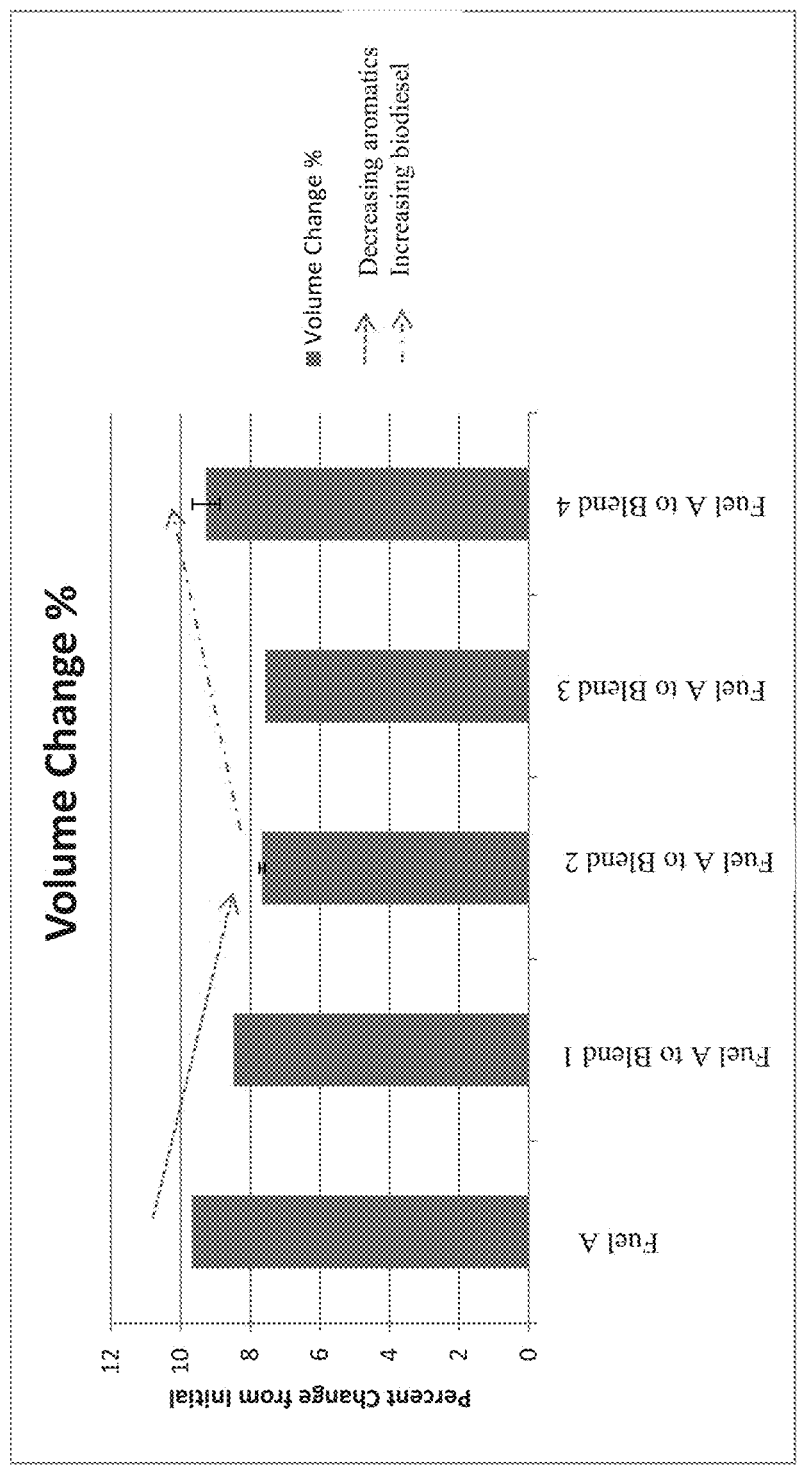
FIG. 1 illustrates volume change percentage of a nitrile butadiene rubber (NBR) after soaking in Fuel A and after soaking in Fuel A followed by soaking in Blend 1, Blend 2, Blend 3, and Blend 4, respectively.

In various aspects of the invention, catalysts and methods for preparing catalysts are provided.

I. DEFINITIONS

For purposes of this invention and the claims hereto, the numbering scheme for the Periodic Table Groups is according to the IUPAC Periodic Table of Elements.

The term "and/or" as used in a phrase such as "A and/or B" herein is intended to include "A and 13", "A or B", "A", and "B".

The terms "substituent", "radical", "group", and "moiety" may be used interchangeably.

As used herein, and unless otherwise specified, the term "$C_n$" means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n.

As used herein, and unless otherwise specified, the term "aromatic" refers to unsaturated cyclic hydrocarbons having a delocalized conjugated π system and having from 4 to 20 carbon atoms (aromatic $C_4$-$C_{20}$ hydrocarbon). Exemplary aromatics include, but are not limited to benzene, toluene, xylenes, mesitylene, ethylbenzenes, cumene, naphthalene, methylnaphthalene, dimethyl naphthalenes, ethylnaphthalenes, acenaphthalene, anthracene, phenanthrene, tetraphene, naphthacene, benzanthracenes, fluoranthrene, pyrene, chrysene, triphenylene, and the like, and combinations thereof. The aromatic may optionally be substituted, e.g., with one or more alkyl group, alkoxy group, halogen, etc. Additionally, the aromatic may comprise one or more heteroatoms. Examples of heteroatoms include, but are not limited to, nitrogen, oxygen, and/or sulfur. Aromatics with one or more heteroatom include, but are not limited to furan, benzofuran, thiophene, benzothiophene, oxazole, thiazole and the like, and combinations thereof. The aromatic may comprise monocyclic, bicyclic, tricyclic, and/or polycyclic rings (in some embodiments, at least monocyclic rings, only monocyclic and bicyclic rings, or only monocyclic rings) and may be fused rings.

As used herein, and unless otherwise specified, the term "diesel fuel" or "diesel boiling-range fuel" refers to a hydrocarbon product having a boiling point range from about 110° C. (initial number represents IBP, or alternatively T1 or T2) to about 425° C. (final number represents FBP, or alternatively T99 or T98), e.g., from about 110° C. to about 400° C., from about 110° C. to about 385° C., from about 110° C. to about 360° C., from about 120° C. to about 425° C., from about 120° C. to about 400° C., from about 120° C. to about 385° C., from about 120° C. to about 360° C., from about 140° C. to about 425° C., from about 140° C. to about 400° C., from about 140° C. to about 385° C., or from about 140° C. to about 360° C., as measured by ASTM standard D2887 (Simulated Distillation, or SLMDIS). IBP and FBP represent initial boiling point and final boiling point, respectively. Txx represents the temperature at which about xx % of the hydrocarbon product boils—for instance, T2 is the point at which about 2% of the hydrocarbon product boils. Diesel boiling-range fuel may be used in any suitable engine or process which requires or can utilize the above-mentioned boiling point range, e.g., as transportation fuel, turbine fuel, bunker fuel, and/or heating fuel.

As used herein, and unless otherwise specified, the term "petrodiesel" refers to a fractional distillate of petroleum, generally from between 150° C. and about 400° C. containing about $C_8$ to $C_{28}$ hydrocarbons and further defined to meet ASTM standard D975.

As used herein, and unless otherwise specified, the term "biodiesel" refers diesel fuels derived from transesterification of vegetable oils or animal fats into alkyl esters of long-chain fatty acids. The term "biodiesel" is further defined to meet ASTM standard. D6751. Biodiesel is typically made by chemically reacting lipids with an alcohol (e.g., methanol or ethanol) to produce fatty acid esters. Examples of biodiesel include, but are not limited to FAME (fatty acid methyl ester) or RME (rape seed methyl ester).

As used therein, and unless otherwise specified, the term "renewable diesel" refers to any diesel derived from a biological source or biomass through processes such as, but not limited to hydrotreating, thermal conversion and biomass-to-liquid. Renewable diesels are chemically not esters and therefore are distinct from biodiesel. The term "renewable diesel" is further defined to meet European EN standard 15940. A nonlimiting example of renewable diesel is hydrotreated vegetable oil (HVO).

II. DIESEL BOILING-RANGE FUEL BLEND

As discussed above, a pattern of swelling and shrinking of elastomers in fuel systems due to changes in fuel compositions, particularly aromatics content, can ultimately lead to fuel leaks and vehicle failures. Thus, desired aromatics reduction by blending of renewable diesel with petrodiesel may be limited to minimize subsequent elastomer shrinking. However, it has been discovered that blending a combination of renewable diesel and biodiesel in appropriate amounts with a petrodiesel fuel can achieve a diesel boiling-range fuel blend with not only substantially reduced aromatics content, but also with the ability to minimize elastomer shrinkage in fuel systems.

Such diesel boiling-range fuel blends are provided herein. The diesel-boiling range fuel blends may comprise a renewable diesel, a biodiesel, and a petrodiesel. The renewable diesel and biodiesel may be present in a sufficient amount such that the diesel boiling-range fuel blend may be capable of producing a minimal volume change of at least one swellable elastomer in a diesel-boiling range fuel system compared to a reference volume change of the least one swellable elastomer.

As understood herein, the term "volume change" corresponds to a percentage change in volume of the at least one swellable elastomer when contacted with: (i) the petrodiesel fuel or a different petrodiesel fuel, and then (ii) the diesel boiling-range fuel blend. Further, as understood herein, the "reference volume change" corresponds to a volume change experienced by a swellable elastomer when contacted with a higher aromatic diesel fuel, such as the petrodiesel fuel. Both the volume change and reference volume change are measured according to ASTM standard D471. For example, a swellable elastomer may swell or increase in volume when contacted with the petrodiesel fuel, and that increase in volume, e.g., a volume that increases 10% from initial volume of the swellable elastomer, may be considered as a reference volume change. Following contact with the petrodiesel, the swellable elastomer may be contacted with a diesel boiling-range fuel blend and the swellable elastomer may then shrink or decrease in volume to, e.g., a volume that is an 8.5% increase from the initial volume of the swellable elastomer. Thus, in such an instance, it would be considered that the diesel boiling-range fuel produced a volume change of the swellable elastomer of 8.5%. In other words, the diesel boiling-range fuel produced a volume change within about 2% (i.e., 10%−8.5%=1.5%) compared to the reference volume change. Smaller volume changes with respect to the reference volume correspond to minimal shrinking of the swellable elastomer, which allows for improved performance and extended lifetime of the elastomers.

Advantageously, the diesel boiling-range fuel blend described herein may be capable of producing a volume change of at least one swellable elastomer in a diesel-boiling range fuel system within about 5.0%, within about 4.0%, within about 3.0%, within about 2.0%, within about 1.5%, within about 1.0%, within about 0.50%, or within about 0.20% compared to a reference volume change. In particular, diesel boiling-range fuel blend may be capable of producing a volume change of at least one swellable elastomer in a diesel-boiling range fuel system within about 1.0% or within about 0.50% compared to a reference volume change.

Additionally or alternatively, the diesel boiling-range fuel blend maybe capable of producing a volume change of at least one swellable elastomer in a diesel-boiling range fuel system of about 0.20% to about 5.0%, about 0.20% to about 3.0%, about 0.20% to about 2.0%, about 0.20% to about 1.5%, or about 0.20% to about 1.0%.

In various aspects, renewable diesel may be present in the diesel boiling-range fuel in an amount of at least about 2.0 vol %, at least about 5.0 vol %, at least about 10 vol %, at least about 15 vol %, at least about 20 vol %, at least about 25 vol %, at least about 30 vol %, at least about 35 vol %, at least about 40 vol %, at least about 45 vol %, at least about 50 vol %, at least about 55 vol %, or at least about 60 vol %, or at least about 70 vol %. In particular, renewable diesel may be present in the diesel boiling-range fuel in an amount of at least about 20 vol % or at least about 30 vol % Additionally or alternatively, renewable diesel may be present in the diesel boiling-range fuel in an amount of about 2.0 vol % to about 60 vol %, about 5.0 vol % to about 60 vol %, about 10 vol % to about 60 vol %, about 15 vol % to about 50 vol %, about 20 vol % to about 45 vol % or about 30 vol % to about 45 vol %.

In certain variations, the renewable diesel may not be a Fischer-Tropsch diesel.

Additionally, biodiesel may be present in the diesel boiling-range fuel in an amount of at least about 0.10 vol %, at least about 0.30 vol %, at least about 0.50 vol %, at least about 1.0 vol %, at least about 3.0 vol %, at least about 5.0 vol %, at least about 8.0 vol %, at least about 10 vol %, at least about 12 vol %, at least about 15 vol % or about 20 vol %. Additionally or alternatively, biodiesel may be present in the diesel boiling-range fuel in an amount of about 0.10 vol % to about 20 vol %, about 0.10 vol % to about 15 vol %, about 0.30 vol % to about 12 vol %, about 0.50 vol % to about 10 vol % or about 3.0 vol % to about 12 vol %. In particular, biodiesel may be present in the diesel boiling-range fuel in an amount of about 0.50 vol % to about 10 vol %

Further, petrodiesel may be present in the diesel boiling-range fuel in an amount of at least about 20 vol %, at least about 25 vol %, at least about 30 vol %, at least about 35 vol %, at least about 40 vol %, at least about 45 vol %, at least about 50 vol %, at least about 55 vol %, at least about 60 vol %, at least about 65 vol %, at least about 70 vol %, or about 75 vol %. In particular, petrodiesel may be present in the diesel boiling-range fuel in an amount of at least about 40 vol % or at least about 50 vol %, Additionally or alternatively, petrodiesel may be present in the diesel boiling-range fuel in an amount of about 20 vol % to about 75 vol %, 25 vol % to about 70 vol %, about 30 vol % to about 65 vol %, about 40 vol % to about 60 vol %, or about 50 vol % to about 60 vol %.

In a particular embodiment, the diesel boiling-range fuel may comprise renewable diesel in an amount of at least about 20 vol %, biodiesel in an amount of about 0.50 vol % to about 10 vol % and petrodiesel in an amount of at least about 40 vol %.

In other embodiments, the diesel boiling-range fuel may comprise renewable diesel in an amount of about 20 vol % to about 45 vol % and petrodiesel in an amount of about 40 vol % to about 60 vol %.

Advantageously, the diesel boiling-range fuel described herein has a lower aromatics content due to the combination of renewable diesel and biodiesel blended with the petrodiesel. Furthermore, diesel boiling-range fuel described herein is able to achieve a large reduction in aromatics from the same or different petrodiesel fuel alone. In various aspects, the boiling-range fuel blend may have an aromatics content of less than or equal to about 40 vol %, less than or equal to about 35 vol %, less than or equal to about 30 vol %, less than or equal to about 25 vol %, less than or equal to about 20 vol %, less than or equal to about 15 vol %, or about 10 vol %. In particular, the boiling-range fuel blend may have an aromatics content of less than or equal to about 25 vol % or less than or equal to about 20 vol %. Further, the boiling-range fuel blend may have an aromatics content of about 10 vol % to about 40 vol %, about 10 vol % to about 30 vol % or about 10 vol % to about 20 vol %

Furthermore, the diesel boiling-range fuel described herein may be able to achieve a large reduction in aromatics from the same or different petrodiesel fuel alone and still minimize swellable elastomer shrinkage. Thus, optionally in combination with the small volume change with respect to the reference volume change as described herein, the diesel boiling-range fuel may have an aromatics contents of at least about 5.0 wt. % less, at least about 8.0 wt. % less, at least about 10.0 wt. % less, at least about 13.0 wt. % less, at least about 15.0 wt. % less, at least about 18.0 wt. % less or about 20 wt. % less than the aromatics contents of the same or different petrodiesel fuel, the wt % based upon total weight of the diesel boiling-range fuel. In particular, optionally in combination with the small volume change with respect to the reference volume change as described herein, the diesel boiling-range fuel may have an aromatics contents of at least about 10 wt. % less or at least about 15 wt. % less than the aromatics contents of the same or different petrodiesel fuel. Additionally or alternatively, the diesel boiling-range fuel may have an aromatics contents of about 5.0 wt. % to about 20 wt. % less, about 8.0 wt. % to about 20 wt. % less, or about 10 wt. % to about 20 wt. % less than the aromatics contents of the same or different petrodiesel fuel.

Any suitable swellable elastomer is contemplated herein. As used herein, the term "swellable elastomer" refers to natural or synthetic polymers (e.g., rubber) capable of increasing or decreasing in volume when contacted with a hydrocarbon fuel composition. Examples of swellable elastomers include, but are not limited to nitrile rubbers (e.g., nitrile butadiene rubber or acrylonitrile-butadiene rubber), hydrogenated nitrile rubbers (e.g., hydrogenated acrylonitrile-butadiene rubber), ethylene-propylene rubbers (e.g., ethylene propylene diene rubber), fluorocarbon rubbers, chloroprene rubbers, silicone rubbers, fluorosilicone rubbers, polyacrylate rubbers, ethylene acrylic rubbers, styrene-butadiene rubbers, polyurethane rubbers (e.g., polyester urethane, polyether urethane), natural rubber (e.g., polyisoprene), and combinations thereof. In particular, the swellable elastomer is a nitrile rubber, such as nitrile butadiene rubber.

III. METHODS FOR PREPARING DIESEL BOILING-RANGE FUEL BLENDS

Methods for preparing diesel boiling-range fuel blends as described herein are also provided in the present disclosure. The methods may include blending suitable amounts of renewable diesel and biodiesel as described herein with petrodiesel fuel to produce a diesel boiling-range fuel blend having a low aromatics content. In some embodiments, the renewable diesel may not be a Fischer-Tropsch diesel.

The renewable diesel, biodiesel and petrodiesel fuel may be blended in the amounts described above corresponding to the renewable diesel, biodiesel and petrodiesel fuel components of the diesel boiling-range composition. For example, at least about 20 vol % renewable diesel and about 0.50 vol % to about 10 vol % biodiesel may be blended with at least about 40 vol % petrodiesel to produce a diesel boiling-range fuel blend. Additionally or alternatively, the renewable diesel may be blended in an amount of about 20 vol % to about 45 vol % and the petrodiesel may be blended in an amount of about 40 vol % to about 60 vol %. In further aspects, the renewable diesel and the biodiesel in combination may be blended in amount of at least about 30 vol %, at least about 40 vol %, at least about 45 vol %, at least about 50 vol %, at least about 55 vol % or about 60 vol %.

In various aspects, the petrodiesel fuel has a higher aromatics content than the resultant diesel boiling-range fuel. For the example, the petrodiesel fuel may have an aromatics content of at least about 10 wt. %, at least about 15 wt. %, at least about 20 wt. %, at least about 25 wt. %, at least about 30 wt. %, at least about 35 wt. %, at least about 40 wt. %, at least about 45 wt. %, at least about 50 wt. %, at least about 55 wt. % or about 60 wt. %. In particular, the petrodiesel fuel may have an aromatics content of at least about 30 wt. %. Additionally or alternatively, the petrodiesel fuel may have an aromatics content of about 10 wt. % to about 60 wt. %, about 15 wt. % to about 60 wt. %, about 20 wt. % to about 60 wt. %, about 20 wt. % to about 50 wt. %, about 25 wt. % to about 45 wt. % or about 30 wt. % to about 40 wt %.

Further, the diesel boiling-range fuel blend composition produced by the methods described herein may have an aromatics content as described herein, e.g., less than or equal to about 25 wt. %, particularly less than or equal to about 20 wt. % and/or at least about 10% less than the aromatics content of the petrodiesel fuel alone.

Additionally, the diesel boiling-range fuel blends produced according to the methods described herein advantageously may be capable of producing a minimal volume change as described herein of at least one swellable elastomer as described herein in a diesel-boiling range fuel system compared to a reference volume change as described herein of the at least one swellable elastomer. For example, the diesel boiling-range fuel blends produced according to the methods described herein may be capable of producing a volume change of at least one swellable elastomer in a diesel boiling-range fuel system within about 1.0% or about 0.50% compared to a reference volume change as described herein of the least one swellable elastomer.

In further embodiments, diesel boiling-range fuel blends produced according to the methods described herein are also provided.

IV. METHODS FOR REDUCING SWELLABLE ELASTOMER SHRINKAGE IN DIESEL BOILING-RANGE FUEL SYSTEMS

Methods for reducing swellable elastomer shrinkage in diesel boiling-range fuel systems are also provided herein. The methods may comprise contacting at least one swellable elastomer as described herein with a diesel boiling-range fuel blend as described herein. For example, the diesel boiling-range fuel blend may comprise at least about 20 vol % renewable diesel, about 0.50 vol % to about 10 vol % biodiesel, and at least about 40 vol % petrodiesel. Additionally or alternatively, the renewable diesel may be present in amount of about 20 vol % to about 45 vol % and the petrodiesel may be present in an amount of about 40 vol % to about 60 vol %. In some embodiments, the renewable diesel may not be a Fischer-Tropsch diesel.

The method may further comprise contacting the at least one swellable elastomer with the same or different petrodiesel, for example, before and/or after the at least one swellable elastomer contacts the diesel boiling-range fuel blend. Contact with the same or different petrodiesel may cause swelling of the swellable elastomer while contact with the diesel boiling-range fuel blend may cause shrinking of the swellable elastomer. However, as discussed herein, when contacted with the diesel boiling-range fuel blend, the at least one swellable elastomer advantageously may undergo a minimal volume change as described herein, e.g., within about 1.0% or within about 0.50%, compared to a reference volume change as described herein.

Additionally or alternatively, the diesel boiling-range fuel blend described herein may have an aromatics content as described herein, e.g., less than or equal to about 25 wt. %, particularly less than or equal to about 20 wt. % and/or at least about 10% less than the aromatics content of the petrodiesel fuel alone.

The swellable elastomer may be a nitrile rubber, a hydrogenated nitrile rubber, an ethylene propylene rubber, a fluorocarbon rubber, a chloroprene rubber, a silicone rubber, a fluorosilicone rubbers, a polyacrylate rubber, an ethylene acrylic tubber, a styrene-butadiene rubber, a polyurethane rubber, a natural rubber, and a combination thereof.

V. FURTHER EMBODIMENTS

The invention can additionally or alternatively include one or more of the following embodiments.

Embodiment 1. A diesel boiling-range fuel blend comprising: a renewable diesel in an amount of at least about 20 vol % (e.g., about 20 vol % to about 45 vol %); a biodiesel in an amount of about 0.50 vol % to about 10 vol %; and a petrodiesel fuel in an amount of at least about 40 vol % (e.g., about 40 vol % to about 60 vol %); wherein the diesel boiling-range fuel blend is capable of producing a volume change of at least one swellable elastomer in a diesel-boiling range fuel system within about 1.0% or within about compared to a reference volume change of the least one swellable elastomer; wherein the volume change is a percentage change in volume of the least one swellable elastomer when contacted with: (i) the petrodiesel fuel or a different petrodiesel fuel, and then (ii) the diesel boiling-range fuel blend.

Embodiment 2. The diesel boiling-range fuel blend of embodiment 1 further comprising aromatics in an amount of less than or equal to about 25 wt. % and/or having an aromatics content of at least about 10% less than the aromatics content of the petrodiesel fuel alone or the different petrodiesel alone.

Embodiment 3. The diesel boiling-range fuel blend of embodiment 1 or 2, wherein the renewable diesel is not a Fischer-Tropsch diesel.

Embodiment 4, The diesel boiling-range fuel blend of any one of the previous embodiments, wherein the at least one swellable elastomer is selected from the group consisting of a nitrile rubber, a hydrogenated nitrile rubber, an ethylene propylene rubber, a fluorocarbon rubber, a chloroprene rubber, a silicone rubber, a fluorosilicone rubbers, a polyacrylate rubber, an ethylene acrylic rubber, a styrene-butadiene rubber, a polyurethane rubber, a natural rubber, and a combination thereof.

Embodiment 5. A method for reducing swellable elastomer shrinkage in a diesel-boiling range fuel system, wherein the method comprises: contacting at least one swellable elastomer with a diesel boiling-range fuel blend of any one of the previous embodiments; wherein the at least one swellable elastomer undergoes a volume change within about 1.0% or within about 0.5% compared to a reference volume change; wherein the volume change is a percentage change in volume of the least one swellable elastomer when contacted with: (i) the petrodiesel fuel or a different petrodiesel fuel, and then (ii) the diesel boiling-range fuel blend; and, optionally, further comprising contacting the at least one swellable elastomer with the petrodiesel fuel or the different petrodiesel fuel.

Embodiment 6. The method of embodiment 5, wherein the at least one swellable elastomer is selected from the group consisting of a nitrile rubber, a hydrogenated nitrile rubber, an ethylene propylene rubber, a fluorocarbon rubber, a chloroprene rubber, a silicone rubber, a fluorosilicone rubbers, a polyacrylate rubber, an ethylene acrylic rubber, a styrene-butadiene rubber, a polyurethane rubber, a natural rubber, and a combination thereof.

Embodiment 7. A method for preparing a diesel boiling-range fuel blend of any one of embodiments 1 to 4 comprising: blending at least about 20 vol % (e.g., about 20 vol % to about 45 vol %) renewable diesel and about 0.50 vol % to about 10 vol % biodiesel with at least about 40 vol % (e.g., about 40 vol % to about 60 vol %) of a petrodiesel fuel to produce a diesel boiling-range fuel blend having an aromatics content of less than or equal to about 25 vol %.

Embodiment 8. The method of embodiment 7, wherein the petrodiesel fuel has an aromatics content of at least about 30 wt. %, the diesel boiling-range fuel blend has an aromatics content of less than or equal to about 20 wt. %, and/or the diesel boiling-range fuel blend has an aromatics content of at least about 10% less than the aromatics content of the petrodiesel fuel alone.

Embodiment 9. The method of embodiment 7 or 8, wherein the renewable diesel and the biodiesel are blended in an amount of at least about 50 vol %.

Embodiment 10. The method of any one of embodiments 7 to 9, wherein the renewable diesel is not a Fischer-Tropsch diesel.

EXAMPLES

Example 1

Preparation of Diesel-Boiling Range Fuel Blends

A high aromatic diesel fuel ("Fuel A") was obtained from Joliet Refinery. Various blends were prepared using Fuel A, a hydrotreated vegetable oil ("HVO") that meets the European EN 15940 standard as the renewable diesel (obtained from REG Geismar), and a fatty acid methyl ester (FAME) biodiesel that meets the ASTM D6751 standard. The properties of Fuel 1, the renewable diesel and the biodiesel used are provided in Tables 1, 2 and 3, respectively.

TABLE 1

Properties of Fuel A

| ASTM Test Method No. | Property | Value |
|---|---|---|
| D5186 | Total Aromatics | 35.71 wt. % |
| D5186 | Monoaromatics | 28.47 wt. % |
| D5186 | Polynuclear Aromatics | 7.24 wt. % |
| D86 | Initial Boiling Point | 184.3° C. |
| D86 | 5 vol. % recovered | 197.7° C. |
| D86 | 10 vol. % recovered | 209.5° C. |
| D86 | 20 vol. % recovered | 222.4° C. |
| D86 | 30 vol. % recovered | 234.8° C. |
| D86 | 40 vol. % recovered | 246.7° C. |
| D86 | 50 vol. % recovered | 258.8° C. |
| D86 | 60 vol. % recovered | 272.3° C. |
| D86 | 70 vol. % recovered | 286.9° C. |
| D86 | 80 vol. % recovered | 303.7° C. |
| D86 | 90 vol. % recovered | 324.3° C. |
| D86 | 95 vol. % recovered | 341.2° C. |
| D86 | End Temperature | 355.2° C. |
| D86 | Vol. % Recovered | 96.8 |
| D86 | Vol. % Residue | 1.1 |
| D86 | Vol. % Loss | 2.1 |
| D86 | Barometric Pressure | 760 Torr |

TABLE 2

Properties of Renewable Diesel (HVO)

| ASTM Test Method No. | Property | Value |
|---|---|---|
| D86 | Initial Boiling Point | 139.8° C. |
| D86 | 5 vol. % recovered | 263° C. |
| D86 | 10 vol. % recovered | 270.7° C. |
| D86 | 20 vol. % recovered | 276.1° C. |
| D86 | 30 vol. % recovered | 279° C. |
| D86 | 40 vol. % recovered | 281.1° C. |
| D86 | 50 vol. % recovered | 283.1° C. |
| D86 | 60 vol. % recovered | 285.1° C. |
| D86 | 70 vol. % recovered | 287.3° C. |
| D86 | 80 vol. % recovered | 290.1° C. |
| D86 | 90 vol. % recovered | 293.7° C. |
| D86 | 95 vol. % recovered | 296.9° C. |
| D86 | End Temperature | 311.9° C. |
| D86 | Vol. % Recovered | 96.8 |
| D86 | Vol. % Residue | 1.2 |
| D86 | Vol. % Loss | 2 |
| D86 | Barometric Pressure | 760 Torr |
| D445 | Kinematic viscosity at 40° C. | 3.051 mm$^2$/s |
| D4052 | Density of liquids at 60° F. | 0.7793 g/mL |
| D5186 | Total Aromatics | 1.05 wt. % |
| D5186 | Monoaromatics | 0.81 wt. % |
| D5186 | Polynuclear Aromatics | 0.24 wt. % |

TABLE 3

Properties of Biodiesel (FAME)

| ASTM Test Method No. | Property | Value |
|---|---|---|
| D4052 | Density at 60° F. | 0.8834 g/mL |
| D445 | Kinematic viscosity at 40° C. | 4.386 mm$^2$/s |

Fuel A was blended with the renewable diesel fuel, to create a blend with a 10% aromatics content reduction to obtain Blend 1. Fuel A was blended with the renewable diesel fuel to create a different blend with a 15% aromatics content reduction to obtain Blend 2. Blend 2 was blended with the biodiesel to create Blend 3 having 5% biodiesel. Blend 2 was further blended with biodiesel to create Blend 4 having 10% biodiesel. The composition of each of the blends is shown below in Table 4.

TABLE 4

Composition of Fuel Blends

| Blends | Fuel A (vol %) | Renewable Diesel (HVO) (vol %) | Biodiesel (FAME) (vol %) | Aromatics Content (wt. %) |
|---|---|---|---|---|
| Fuel A | 100 | 0 | 0 | 36 |
| Blend 1 | 72 | 28 | 0 | 26 |
| Blend 2 | 58 | 42 | 0 | 21 |
| Blend 3 | 55 | 40 | 5 | 20 |
| Blend 4 | 52 | 38 | 10 | 19 |

Example 2

Elastomer Swell Analysis of Fuel Blends

Figure 2:
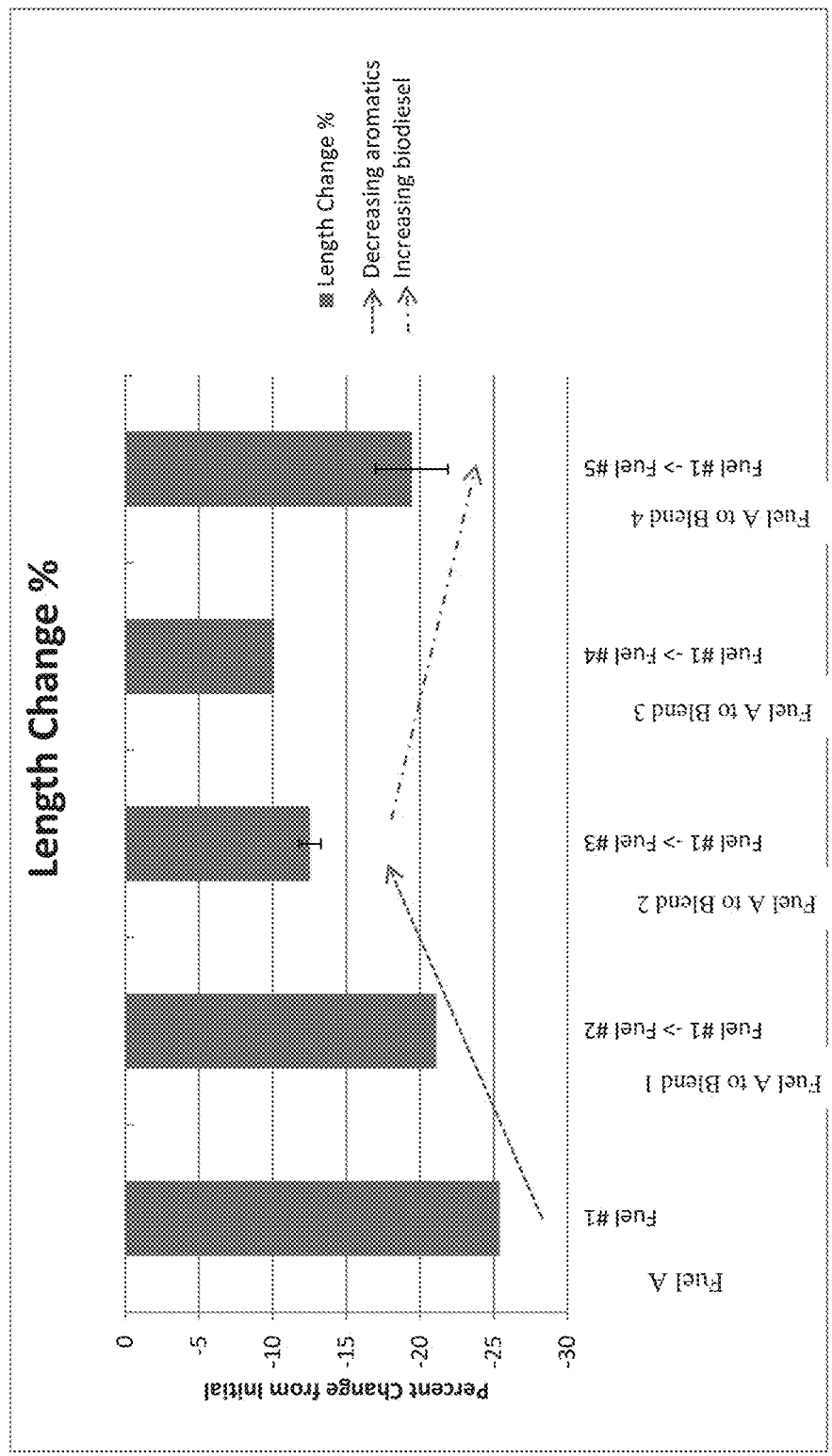
FIG. 2 illustrates length change percentage of a nitrile butadiene rubber (NBR) after soaking in Fuel A and after soaking in Fuel A followed by soaking in Blend 1, Blend 2, Blend 3, and Blend 4, respectively.

Following ASTM standard D471, a a common commercially available nitrile butadiene rubber (NBR) elastomer was soaked in Fuel A for 672 hours, and the elastomer volume change and elongation change were measured. The results are shown in Table 5 and FIGS. 1 and 2. As shown in FIGS. 1 and 2 and Table 5, soaking the NBR elastomer in Fuel A caused an about 9.7% increase in elastomer volume and about 25% decrease in length, respectively. These results were used as a baseline for comparison. Following this initial baseline test, NBR elastomers were first soaked in the base fuel for 672 hours and then soaked in Blend 1, Blend 2, Blend 3 or Blend 4 for an additional 672 hours according to ASTM standard D471. The tests for Blend 2 and Blend 4 were repeated 2 additional times each in order to determine the repeatability of the testing procedure.

TABLE 5

Change in Elastomer Volume and Length

| Fuel Blends | Volume Change % | Length Change % |
|---|---|---|
| Fuel A | 9.68 | −25.4 |
| Fuel A to Blend 1 | 8.48 | −21.1 |
| Fuel A to Blend 2 | 7.66 | −12.53 |
| Fuel A to Blend 3 | 7.57 | −10.10 |
| Fuel A to Blend 4 | 9.27 | −19.43 |

Soaking the NBR elastomer first in the Fuel A and then Blend 2 caused the final elastomer volume change to be about 7.6%. Therefore, the transition from the Fuel A to the 15% lower aromatic fuel (Blend 2) resulted in an about 2.1% reduction in elastomer volume. However, when the elastomer was first soaked in Fuel A and then soaked in Blend 4, which included 10% biodiesel, there was a decrease of only about 0.5% volume versus the Fuel A baseline result, even though the total aromatics content was actually reduced by about 17%. Overall, the results show the trend that a decrease in elastomer volume change % caused by decreasing aromatics may be mitigated by renewable diesel and biodiesel content. The same trend can be seen for the length change (FIG. 2) as well. Changing from Fuel A to Blend 4 provided a result more similar to the Fuel A baseline versus changing from Fuel A to Blend 2, even though the total aromatic content reduction was similar in both cases. Therefore, for swellable elastomers that have been exposed to higher aromatics fuel, the interaction between the biodiesel and elastomer may offset or limit changes to swellable elastomers caused by switching to a fuel with lower aromatics content, such as a renewable diesel.

The invention claimed is:

1. A diesel boiling-range fuel blend comprising:
a renewable diesel comprising hydrotreated vegetable oil (HVO) in an amount of from about 35 vol % to about 40 vol %;
a biodiesel comprising fatty acid methyl ester (FAME) in an amount of about 8 vol % to about 12 vol %; and
a petrodiesel fuel having an aromatics content of about 35 wt % to about 40 wt % in an amount of from about 50 vol % to about 55 vol %, the vol % based upon total volume of the diesel boiling-range fuel blend;
wherein the diesel boiling-range fuel blend produces a volume change of at least one swellable elastomer in a diesel-boiling range fuel system within about 1.0% compared to a reference volume change of the least one swellable elastomer;
wherein the volume change is a percentage change in volume of the least one swellable elastomer when contacted with: (i) the petrodiesel fuel, and then (ii) the diesel boiling-range fuel blend,
wherein the "reference volume change" corresponds to a volume change experienced by the at least one swellable elastomer when contacted with a higher aromatic petrodiesel fuel having an aromatics content of at least about 35 wt %, and
wherein both the volume change and reference volume change are measured according to ASTM standard D471.

2. The diesel boiling-range fuel blend of claim 1 further comprising aromatics in an amount of less than about 20 wt. %, based upon total weight of the diesel boiling-range fuel blend.

3. The diesel boiling-range fuel blend of claim 1 having an aromatics content of at least about 10% less than the aromatics content of the petrodiesel fuel alone or the different petrodiesel fuel alone.

4. The diesel boiling-range fuel blend of claim 1, wherein the renewable diesel is present in an amount of about 38 vol % and the petrodiesel fuel is present in an amount of about 52 vol %.

5. The diesel boiling-range fuel blend of claim 1, wherein the diesel boiling-range fuel blend is capable of producing the volume change within about 0.50% compared to the reference volume change.

6. The diesel boiling-range fuel blend of claim 1, wherein the renewable diesel is not a Fischer-Tropsch diesel.

7. The diesel boiling-range fuel blend of claim 1, wherein the at least one swellable elastomer is selected from the group consisting of a nitrile rubber, a hydrogenated nitrile rubber, an ethylene propylene rubber, a fluorocarbon rubber, a chloroprene rubber, a silicone rubber, a fluorosilicone rubbers, a polyacrylate rubber, an ethylene acrylic rubber, a styrene-butadiene rubber, a polyurethane rubber, a natural rubber, and a combination thereof.

8. A method for reducing swellable elastomer shrinkage in a diesel-boiling range fuel system, wherein the method comprises:
contacting at least one swellable elastomer with a diesel boiling-range fuel blend comprising:
a renewable diesel comprising hydrotreated vegetable oil (HVO) in an amount of from about 35 vol % to about 40 vol %;
a biodiesel comprising fatty acid methyl ester (FAME) in an amount of about 8 vol % to about 12 vol %; and
a petrodiesel fuel having an aromatics content of about 35 wt % to about 40 wt % in an amount of from about 50 vol % to about 55 vol %, the vol % based upon total volume of the diesel boiling-range fuel blend;
wherein the at least one swellable elastomer undergoes a volume change within about 1.0% compared to a reference volume change;
wherein the volume change is a percentage change in volume of the least one swellable elastomer when contacted with: (i) the petrodiesel fuel, and then (ii) the diesel boiling-range fuel blend,
wherein the "reference volume change" corresponds to a volume change experienced by the at least one swellable elastomer when contacted with a higher aromatic petrodiesel fuel having an aromatics content of at least about 35 wt %, and
wherein both the volume change and reference volume change are measured according to ASTM standard D471.

9. The method of claim 8 further comprising contacting the at least one swellable elastomer with the petrodiesel fuel or the different petrodiesel fuel.

10. The method of claim 8, wherein the at least one swellable elastomer undergoes the volume change within about 0.5% compared to the reference volume change.

11. The method of claim 8, wherein the diesel boiling-range fuel blend further comprises aromatics in an amount of less than about 20 wt. %.

12. The method of claim 8, wherein the diesel boiling-range fuel blend has an aromatics content of at least about 10% less than the aromatics content of the petrodiesel fuel alone or the different petrodiesel fuel alone.

13. The method of claim 8, wherein the renewable diesel is present in an amount of about 38 vol % and the petrodiesel fuel is present in an amount of about 52 vol %.

14. The method of claim 8, wherein the renewable diesel is not a Fischer-Tropsch diesel.

15. The method of claim 8, wherein the at least one swellable elastomer is selected from the group consisting of a nitrile rubber, a hydrogenated nitrile rubber, an ethylene propylene rubber, a fluorocarbon rubber, a chloroprene rubber, a silicone rubber, a fluorosilicone rubbers, a polyacrylate rubber, an ethylene acrylic rubber, a styrene-butadiene rubber, a polyurethane rubber, a natural rubber, and a combination thereof.

16. A method for preparing a diesel boiling-range fuel blend comprising:
blending a renewable diesel comprising hydrotreated vegetable oil (HVO) in an amount of from about 35 vol % to about 40 vol %; a biodiesel comprising fatty acid methyl ester (FAME) in an amount of about 8 vol % to about 12 vol %; and a petrodiesel fuel having an aromatics content of about 35 wt % to about 40 wt % in an amount of from about 50 vol % to about 55 vol % to produce a diesel boiling-range fuel blend having an aromatics content of less than about 20 vol %, the vol % based upon total volume of the diesel boiling-range fuel blend,
wherein the diesel boiling-range fuel blend produces a volume change of at least one swellable elastomer in a diesel-boiling range fuel system within about 1.0% compared to a reference volume change of the least one swellable elastomer;
wherein the volume change is a percentage change in volume of the least one swellable elastomer when contacted with: (i) the petrodiesel fuel, and then (ii) the diesel boiling-range fuel blend,
wherein the "reference volume change" corresponds to a volume change experienced by the at least one swellable elastomer when contacted with a higher aromatic petrodiesel fuel having an aromatics content of at least about 35 wt %, and
wherein both the volume change and reference volume change are measured according to ASTM standard D471.

17. The method of claim 16, wherein the petrodiesel fuel has an aromatics content of about 36 wt %.

18. The method of claim 16, wherein the diesel boiling-range fuel blend has an aromatics content of at least about 10% less than the aromatics content of the petrodiesel fuel alone.

19. The method of claim 16, wherein the renewable diesel is blended in an amount of about 38 vol % and the petrodiesel fuel is present in an amount of about 52 vol %.

20. The method of claim 16, wherein the renewable diesel is not a Fischer-Tropsch diesel.

\* \* \* \* \*